(12) United States Patent
Wang et al.

(10) Patent No.: US 9,443,322 B2
(45) Date of Patent: Sep. 13, 2016

(54) METHOD AND ASSOCIATED APPARATUS FOR CORRECTING COLOR ARTIFACT OF IMAGE

(71) Applicant: MediaTek Singapore Pte. Ltd., Singapore (SG)

(72) Inventors: Muge Wang, San Jose, CA (US); Hsien-Che Lee, Pleasanton, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 54 days.

(21) Appl. No.: 14/341,870

(22) Filed: Jul. 28, 2014

(65) Prior Publication Data

US 2015/0071535 A1 Mar. 12, 2015

Related U.S. Application Data

(60) Provisional application No. 61/875,216, filed on Sep. 9, 2013.

(51) Int. Cl.
| | |
|---|---|
| *G06K 9/00* | (2006.01) |
| *G06T 7/40* | (2006.01) |
| *H04N 1/58* | (2006.01) |
| *G06T 5/00* | (2006.01) |

(52) U.S. Cl.
CPC ............... *G06T 7/408* (2013.01); *G06T 5/00* (2013.01); *G06T 5/005* (2013.01); *H04N 1/58* (2013.01); *G06T 2207/10024* (2013.01)

(58) Field of Classification Search
CPC .... G06K 9/4619; G06K 9/46; G06K 9/6211; G06K 9/4671; G06T 2207/10024; G06T 5/00; G06T 5/005; H04N 1/58
See application file for complete search history.

(56) References Cited

U.S. PATENT DOCUMENTS

| | | | |
|---|---|---|---|
| 5,818,525 A | 10/1998 | Elabd | |
| 8,970,745 B2 | 3/2015 | Murayama | |
| 2011/0007270 A1* | 1/2011 | Sarver et al. | 351/206 |
| 2012/0147213 A1* | 6/2012 | Dalton | 348/223.1 |
| 2013/0050529 A1* | 2/2013 | Murayama | 348/234 |
| 2013/0141614 A1* | 6/2013 | Tashiro | 348/238 |

FOREIGN PATENT DOCUMENTS

| | | |
|---|---|---|
| CN | 102957877 A | 3/2013 |
| JP | 2008177794 A | 7/2008 |

(Continued)

OTHER PUBLICATIONS

JP Office Action dated Jul. 21, 2015 in corresponding Japanese application (No. 2014-181353).
English translation of JP Office Action dated Jul. 21, 2015 in corresponding Japanese application (No. 2014-181353).

(Continued)

*Primary Examiner* — Ali Bayat
(74) *Attorney, Agent, or Firm* — McClure, Qualey & Rodack, LLP

(57) ABSTRACT

A method for correcting color shading artifact of an image and associated apparatus is provided. The method comprises: providing a plurality of bases, calculating a plurality of coefficients respectively associated with the bases, generating a correction map by summing the bases respectively weighted by with the coefficients, and providing a corrected image by correcting the image according to the correction map. Each basis is capable of providing a basic correction value for each pixel of an intermediate image which is associated with the image.

38 Claims, 5 Drawing Sheets

(56) References Cited

FOREIGN PATENT DOCUMENTS

| JP | 2008277926 A | 11/2008 |
| JP | 200988800 A | 4/2009 |
| JP | 2013042428 A | 2/2013 |
| JP | 2013118598 A | 6/2013 |
| TW | 201116248 A1 | 5/2011 |

OTHER PUBLICATIONS

EP Search Report dated Mar. 20, 2015 in corresponding European Application (No. 14183384.8).
TIPO Office Action dated Jan. 26, 2016 in corresponding Taiwan application (No. 103130951).

* cited by examiner

METHOD AND ASSOCIATED APPARATUS FOR CORRECTING COLOR ARTIFACT OF IMAGE

This application claims the benefit of U.S. provisional application Ser. No. 61/875,216, filed Sep. 9, 2013, and the subject matter of which is incorporated herein by reference.

FIELD OF THE INVENTION

The invention relates to a method and associated apparatus for correcting color artifact of image, and more particularly, to a method and associated apparatus capable of adaptively synthesizing correction maps by weighted sum of predetermined bases and accordingly correcting image.

BACKGROUND OF THE INVENTION

Electronic device with integrated image system(s) for capturing still and/or motion images (video), such as mobile phone, smart phone, wearable gadget, tablet computer, portable computer, hand-held computer, digital camera, digital camcorder, navigator, interactive toy, game console, remote conference terminal, surveillance system, etc., has become prevailing, popular and essential for contemporary information society. To meet demands for light-weight and compactness, CMOS sensors and tiny optical (lenses) modules are adopted to form embedded image systems. However, such image system suffers color artifacts, e.g., lens color shading (or color shading in brief).

Color shading is a well-known color artifact that exists in digital image systems, and is particularly prominent in images captured by CMOS sensors. When an image system captures an image of a uniformly illuminated gray wall, it is expected to obtain a uniformly gray image as well. However, the captured image will show both intensity non-uniformity and color non-uniformity from the image center to image corners and edges. Typically, intensity non-uniformity causes a captured image to be darker at the image edges and corners than at the image center. This is owing to off-axis geometric factors in image formation, where light is attenuated toward image edges.

Furthermore, color non-uniformity also exists in the captured image. The hue and the chroma of the image color gradually change outward from image center, but do not necessarily follow a radial symmetric pattern, nor attenuate at a constant fall-off rate. The artifact of such color non-uniformity is referred to as color shading. Color shading severely degrades image color quality.

Please refer to FIG. 1 illustrating color shading of different colors. As shown in a 3D surface plot of FIG. 1, a green channel (a distribution of green component of each pixel) of a captured image suffers non-uniformity which falls off at edges and corners of an image, even the image is supposed to be uniform. FIG. 1 also includes a cross-sectional view to demonstrate non-uniformities of green, blue and red channels. It is noted that different color channels suffer different non-uniformities. Comparing to the green and blue channels, the red channel experiences a more serious fall-off toward edges.

The overall gradual attenuation at locations away from image center is considered as vignetting or luminance fall-off. Different fall-offs of different color channels result in color distortion in image. In order to correct overall fall-off and color shading artifacts, additional gains may be applied to the color channels by image signal processing (ISP) to compensate the fall-off uniformities. Since the fall-offs can be different between any two color channels at every spatial location, the correction gains should compensate fall-offs between color channels.

Several factors contribute to formation of color shading, including lens vignetting, pixel vignetting, pixel cross-talk and property of an IR-cut filter, etc. Lens vignetting is an inherent optical property of optical lens (or lenses). Light passing through optical lens falls off from center to peripherals of lens. Theoretical analysis shows that Image irradiance decreases at a rate of cosine to the fourth power, though real lenses may not exactly follow the cosine to the fourth power law. Lens vignetting, i.e. lens fall-off effect, is a strong contributor of intensity non-uniformity.

Another factor of color shading is pixel vignetting, i.e., irradiance fall-off due to pixel structure. Pixel vignetting can be affected by many Causes, such as pixel layout design and structure of micro-lens.

Pixel cross-talk also contributes to color shading. Pixel cross-talk is a phenomenon that a signal of a pixel is erroneously picked up by its adjacent pixels, normally at a different color channel. Pixel cross-talk may include optical cross-talk and electronic cross-talk. Their end effects are similar that signal from one color channel can leak into another color channel. The cross-talk may be mutual.

In order to shield away IR light, IR-cut filters are used in image system. For some types of IR-cut filters, however, the effective cutoff frequency is not a constant in terms of light incident angle. There is a wavelength shift from lens center to lens peripherals. More light may be blocked at lens peripherals than at lens center, if wavelength of the light is near the IR-cut filter cutoff frequencies. As a result, red channel signal can be further attenuated at image corners and edges than green and blue channel signals.

It is well observed that characteristics of color shading are sensitive to type of illuminants (light sources); to be more specifically, spectral composition of incident light. That is, when capturing images under different illuminants, the resultant images will suffer different non-uniformities, even when scenes being captured are the same. Different types of lens-sensor combinations may also cause color shading of different characteristics. Furthermore, due to manufacturing variations, characteristics of color shading are different for different units in the same batch, even under the same illuminant. Therefore, color shading correction becomes essential for the image system.

Conventionally, color shading correction is achieved through complex calibration. In order to calibrate color shading of an image system, the image system is exposed to a uniformly illuminated field, then images are captured under several different kinds of illuminants, so a same number of sets of fall-off maps are obtained by directly measuring non-uniformities of the captured images. Each set of fall-off maps corresponds to one kind of illuminant, including fall-off maps of different color channels. Accordingly, a shading correction map can be prepared to reverse non-uniformity under the corresponding kind of illuminant. After calibration, the shading correction maps corresponding to different types of illuminants are stored in the image system. When capturing an image, the conventional image system first attempts to identify which kind of ambient illuminant is currently exposed, and accordingly selects a corresponding shading correction map to correct color shading of the captured image.

Typically, it is expected that, if more illuminants are calibrated to provide more shading correction maps, a scene has a better chance to be covered by one of the shading correction maps. However, in reality, color shading calibration is constrained by equipment availability, memory requirement, system resource capacity, time requirement, productivity and/or cost concern. Practically, at production line, reducing required repetition of shading calibrations is desired, and consequently compromises effectiveness of color shading correction. In addition, since characteristics of color shading are distinct for different units in a same production batch, calibration on every individual unit is required. Nevertheless, performing calibration on every unit is expensive.

To correctly identify type of illuminant is also a challenge, because the image system for consumer electronics lacks satisfactory ability to resolve wavelength details of illuminants. Moreover, it is very difficult, if not impossible, to enumerate sufficient kinds of illuminants, since real-world illuminant mixes lights from diverse sources of different distances, different incident angles and/or different intensity, including natural radiant bodies, many kinds of man-made radiant sources, reflectors and/or scatterers.

Incorrect illuminant identification and/or lack of proper shading correction map will cause erroneous color shading correction. For example, the corrected image may become reddish in image center, because the red channel is over-compensated.

SUMMARY OF THE INVENTION

The invention provides a low-cost effective technology to correct color shading. According to the invention, tremendous amount of efforts and cost involved in color shading calibration are saved while achieving high image quality.

An objective of the invention is providing a method for correcting color artifact (e.g., color shading) of an image Isc provided (e.g., captured, photographed or filmed) by an image system; the method includes: providing a plurality of bases V[1] to V[N1]; calculating a plurality of coefficients (scalars) a[1] to a[N1] according to an intermediate image I and the bases V[1] to V[N1], with the intermediate image I being associated with the image Isc; generating a correction map m1 by respectively weighting the bases V[1] to V[N1] with the associated coefficients a[1] to a[N1], and summing the weighted bases a[1]*V[1] to a[N1]*V[N1 ], e.g., m1= (a[1]*V[1]+ . . . +a[N1]*V[N1]); and, providing a corrected image I' by correcting the image Isc according to the correction map m1.

Each basis V[n] (for n=1 to N1) may provide a basic correction value V[n](x,y) for each pixel p(x,y) of the intermediate image I; each coefficient a[n] is associated with the basis V[n]. Since the correction map m1 is synthesized by superposition of the products a[1 ]*V[n] to a[N1 ]*V [N1], the correction map m1 is capable of providing a correction value m1(x,y) for each pixel p(x,y) of the intermediate image I.

It is emphasized that different units (image systems) of the same batch, or even different image systems of different designs (e.g., of different combinations of optical module, sensor and associated circuitry), may exploit a same set of bases V[1] to V[N1]; based on the same set of bases V[1] to V[N1], different sets of the coefficients a[1] to a[N1] are utilized to synthesize different correction maps m1 for adaptively correcting color shading of different characteristics due to design, assembling, manufacturing, and/or illuminant. For example, if a same image system captures two images under two different illuminants, then two sets of coefficients a[1] to a[N1] can be obtained to respectively generates two correction maps m1 with the same set of bases V[1] to V[N1], so as to correct the two images. Likewise, two image systems can use their own sets of coefficients a[1] to a[N1] to respectively generates their own correction maps with the same set of the bases V[1] to V[N1], so as to correct images respectively captured by the two image systems.

In an embodiment, the intermediate image I is the image Isc. Alternatively, the method may further include: obtaining the intermediate image Isc by performing a feature extraction on the image Isc, such that dimensions of the image Isc and the intermediate image I may be different. For example, the intermediate image I may include xi*yi pixels and the image Isc may include xs*ys pixels, and the dimensions (xi,yi) and (xs,ys) may be different. For example, dimension of the image Isc may be greater than dimension of the image I, e.g., xs>xi and/or ys>yi. To obtain the intermediate image I, the feature extraction performed on the image Isc may include: scaling (e.g., up-scaling or down-scaling), re-sampling (e.g., up-sampling or down-sampling), and/or locally averaging (e.g., block averaging) the image Isc.

The method may further include: according to the correction map m1, providing an auxiliary correction map msc1, such that the auxiliary correction map msc1 may provide a correction value msc1 (x,y) for each pixel p(x,y) of the image Isc. That is, while the correction map m1 may be of dimension xi*yi to provide xi*yi correction values for the xi*yi pixels of the intermediate image I, the auxiliary correction map msc1 may be of dimension xs*ys to provide xs*ys correction values for the xs*ys pixels of the image Isc. In the embodiment where the intermediate image I is the image Isc, the auxiliary correction map msc1 may be the correction map m1. In the embodiment where dimensions of the intermediate image I and the image Isc differ, the auxiliary correction map msc1 may be derived from the correction map m1 by, for example, performing interpolation on the correction map m1.

The method of the invention may further include: calculating an auxiliary channel C1 according to color channels of the image Isc. The step of providing the corrected image I' may include: calculating a corrected auxiliary channel C1' according to the correction map m1 and the auxiliary channel C1, and constructing a corrected color channel c1' of the corrected image I' according to the corrected auxiliary channel C1'. The term "channel" of an image is used to represent a distribution capable of providing a value for each pixel p(x,y) of the image (e.g., Isc or I); for example, the auxiliary channel C1 provides a value C1 (x,y) for each pixel p(x,y) of the image Isc. Similarly, the term "color channel" of an image is used to represent a (prime) color component distribution of the image; for example, a green color channel (or green channel in brief) of an image can describe a green component for each pixel of the image Isc. In a color ratio based embodiment, the auxiliary channel C1 of the image Isc may be calculated by dividing a predetermined color channel c1 of the image Isc by a reference color channel c0 of the image Isc, i.e., C1=(c1/c0), or equivalently, C1(x,y)= (c1 (x,y)/c0(x,y)). Similarly, the corrected auxiliary C1' may be defined by a ratio dividing the corrected color channel c1' of the corrected image I' by another color channel c0' of the image I', i.e., C1'=(c1'/c0'). The color channels c0 and c0' may be of the same color, e.g., green; the color channels c1 and c1' may be of the same color, e.g., red or blue.

Continuing the color ratio based embodiment where C1= (c1/c0), the corrected auxiliary channel C1' may be calculated by multiplying the auxiliary channel C1 with the auxiliary correction map msc1, i.e., C1'=C1 *msc1, or equivalently, C1'(x,y)=(C1(x,y)*msc1(x,y)). In an embodiment, the color channel c0' of the corrected image I' may be set equal to the color channel c0 of the image Isc (e.g., c0'(x,y)=c0(x,y)), and the step of constructing the corrected color channel c1' of the corrected image I' may therefore include: multiplying the reference color channel c0 of the image Isc with the corrected auxiliary channel C1'; i.e., c1'=c0*C1', or equivalently, c1'(x,y)=(c0(x,y)*C1'(x,y)). If the color channel c0' is set equal to c0, because the corrected auxiliary channel C1' is defined by (c1'/c0'), so the corrected auxiliary channel C1' also equals (c1'/c0); on the other hand, the corrected auxiliary channel C1' may be calculated by C1'=C1*msc1=(c1/c0)*msc1, hence C1'=(c1'/c0)=(c1/c0)*msc1, and c1'=c1*msc1; that is, the color channel c1' of the corrected image I' may be equivalently constructed by multiplying the color channel c1 of the image Isc of the same color with the auxiliary correction map msc1, i.e., c1'=c1*msc1.

Other than the color ratio based embodiment, in a logarithmic color ratio based embodiment, the auxiliary channel C1 may be calculated by taking a logarithm log(.) of a ratio (c1/c0) dividing a predetermined color channel c1 of the image Isc by a reference color channel c0 of the image Isc; i.e., C1=log(c1/c0), or equivalently, C1(x,y)=log(c1(x,y)/c0(x,y)). Similarly, the corrected auxiliary channel C1' may be defined by a logarithm of a ratio dividing the corrected color channel c1' of the corrected image I' by the color channel c0' of the image I', i.e., C1'=log(c1'/c0'). During correction, the corrected auxiliary channel C1' may be calculated by summing the auxiliary channel C1 and the auxiliary correction map msc1; i.e., C1'=(C1+msc1), or C1'(x,y)=(C1(x,y)+msc1(x,y)). As the color channel c0' of the image I' may be chosen equal to the color channel c0 of the image Isc, the step of constructing the corrected color channel c1' of the corrected image I' may include: multiplying the reference color channel c0 of the image Isc with an inverse logarithm exp(.) of the corrected auxiliary channel C1'; i.e., c1'=c0*exp(C1'), or equivalently, c1'(x,y)=c0(x,y)*exp(C1'(x,y)). For the case when the color channel c0' is set equal to the color channel c0, since the corrected auxiliary channel C1' equals log(c1'/c0') by definition, the corrected auxiliary channel C1' also equals log(c1'/c0); on the other hand, because C1'=(C1+msc1)=(log(c1/c0)+msc1)=log(c1*exp(msc1)/c0), so C1'=log(c1'/c0)=log(c1*exp(msc1)/c0), i.e., c1'=c1*exp(msc1); that is, the corrected color channel c1' of the corrected image I' may be equivalently constructed by multiplying the channel c1 of the image Isc of the same color with an inverse logarithm exp(.) of the auxiliary correction map msc1, i.e., c1'=c1*exp(msc1).

The bases V[1] to V[N] used in the color ratio based embodiment may be different from the bases V[1] to V[N] used in the logarithmic color ratio based embodiment. In other words, though both the two kinds of embodiments may form the correction map by linear superposition of bases. Various embodiments may employ different bases.

In an embodiment, the coefficients a[1] to a[N1] are so solved that they may minimize a target function U(A1,V1,I), which receives a set of candidate coefficients ac[1] to ac[N1] (collectively denoted as a set A1), the bases V[1] to V[N1] (collectively denoted as a set V1) and the intermediate image I as inputs. That is, among different sets of candidate coefficients, if a set of candidate coefficients can minimize the target function U(A1,V1,I) when the set of candidate coefficients is input to the target function U(A1,V1,I) as the set A1, then the candidate coefficients of the set are chosen to be the coefficients a[1] to a[N1]. The target function U(A1,V1,I) may include a first cost function U1(A1,V1,I) and a second cost function U2(A1,mA).

In an embodiment, the first cost function U1(A1,V1,I) is capable of indicating uniformity. For example, the first cost function U1(A1,V1,I) may be formulated by a sum of weighted local terms w1(x,y)*U1(x,y;A1,V1,I) accumulated over all pixels p(x,y) of the intermediate image I. Each local term U1(x,y;A1,V1,I) is associated with a pixel p(x,y) of the intermediate image I, and may be formulated by a q-th powered norm of a spatial gradient $\nabla$ of a pseudo corrected auxiliary channel Cd1' at the associated pixel p(x,y), i.e., u1(x,y;A1,V1,I)=$\|\nabla Cd1'(x, y;A1, V1,I)\|_p^q$, wherein the norm $\|.\|_p$ may be a p-norm. The pseudo corrected auxiliary channel Cd1' is formulated according to the intermediate image I and a pseudo correction map mc1, where the pseudo correction map mc1 may be formulated by a sum of the bases V[1] to V[N1] respectively weighted by the input candidate coefficients ac[1] to ac[N1]; i.e., mc1=(ac[1]*V[1]+ ... +ac[N1]*V[N1]).

In an embodiment, a relation associating the pseudo corrected auxiliary channel Cd1' with the pseudo correction map mc1 and an auxiliary channel Ca1 of the intermediate image I may be identical to a relation associating the corrected auxiliary channel C1' with the auxiliary correction map msc1 and the auxiliary channel C1 of the image Isc, wherein the auxiliary channel Ca1 may be formulated by CA1=(cA1/ca0) or log(cA1/ca0) respectively in the color ratio based embodiment or the logarithmic color ratio based embodiment, with channels ca1 and ca0 being two color channels of the intermediate image I, the color channels ca1 and cb1 may be of the same color, and the color channels ca0 and cb0 may be of the same color. Accordingly, in the color ratio based embodiment where C1=(c1/c0) and C1'=(C1*msc1), the pseudo corrected auxiliary channel Cd1' may be formulated by Cd1'=(CA1*mc1); in the alternative logarithmic color ratio based embodiment where C1=log(c1/c0) and C1'=(C1+msc1), the pseudo corrected auxiliary channel Cd1' may be formulated by Cd1'=(CA1+mc1).

As each local term u1(x,y;A1,V1,I) is weighted by a weighting term w1(x,y), the weighting term w1(x,y) is exploited to exclude, filtrate or suppress a local term u1(x,y;A1,V1,I) from the first cost function U1(A1,V1,I) if the associated pixel p(x,y) of the intermediate image I is located at regions of high spatial variation. Accordingly, the weighting term w1(x,y) may be determined according to a gradient term G1(x,y), which may be equal to (or be calculated based on) $\|\nabla Ca1(x,y)\|_p$, $\|\nabla ca1(x,y)\|_p$, $\|\nabla ca0(x,y)\|_p$ or $\|\nabla L(x,y)\|_p$, where the term L(x,y) represents luminance of the intermediate image I at pixel p(x,y). In an embodiment, if the gradient term G1(x,y) at a given pixel p(x,y) is greater than a threshold, then the weighting term w1(x,y) for the pixel p(x,y) is set to 0; if the gradient term G1(x,y) is less than the threshold, then the weighting term w1(x,y) is set to 1. That is, the weighting term w1(x,y) may be selectively set to two different constants 0 and 1 according to whether the gradient term G1(x,y) is less than a threshold. In an alternative embodiment, value of the weighting term w1(x,y) is set between 0 and 1, inclusive; for a greater gradient term G1(x,y), the weighting term w1(x,y) is assigned to a less value, i.e., a value closer to 0. The weighting terms w1(x,y) of all pixels p(x,y) are collectively referred to as a weighting map w1.

The second cost function U2(A1,mA) may be indicative of a difference between the set A1 of the candidate coefficients ac[1] to ac[N1], and a set mA of reference coefficients ma[1] to ma[N1]. With the set A1 expressed as an N1 by 1 column vector listing the candidate coefficients ac[1] to ac[N1], and the set mA expressed as another N1 by 1 column vector listing the reference coefficients ma[1] to ma[N1], the second cost function U2(A1,mA) may be expressed by Ld1*(A1−mA)$^T$*Vcd*(A1−mA), wherein the term Ld1 may be a balancing coefficient; as the vector difference (A1−mA) is also an N1 by 1 column vector, the term Vcd may be an N1 by N1 positive-definite or nonnegative-definite matrix. The set mA may represent a priori information.

Besides the embodiment where the correction map m1=a[1]*V[1]+ . . . +a[N1]*V[N1], in an alternative embodiment, the correction map m1 may be expressed by m1=a0*V[0]+a[1]*V[1]+ . . . +a[N1]*V[N1], wherein an additional basis V[0] weighted by a constant coefficient a0 may be jointly applied in constructing the correction map m1. For example, the coefficient a0 may be constantly set equal to 1; the key issue is that the coefficient a0 for weighting the basis V[0] is not subject to optimization of the target function.

Alternatively, a single auxiliary channel C1 is calculated to solve a single set of the coefficients a[1] to a[N1], so a single correction map m1, a single auxiliary correction map msc1, and a single corrected auxiliary channel C1' may be obtained to accordingly correct a single color channel c1' (e.g., a red color channel) of the corrected image I', while other color channels (e.g., blue and green color channels) of the corrected image I' may be set equal to those of the original image Isc.

In an embodiment, multiple auxiliary channels, e.g., C1 and C2, are calculated to respectively solve multiple sets of the coefficients, e.g., a[1] to a[N1] and b[1] to b[N2], so multiple correction maps (e.g., m1 and m2), multiple auxiliary correction maps (e.g., mscb1 and msc2), as well as multiple corrected auxiliary channels (e.g., C1' and C2'), may be obtained to accordingly correct multiple color channels, e.g., c1' and c2' (such as a red color channel and a blue color channel) of the corrected image I', while rest color channel(s) of the corrected image I', if any (e.g., the green color channel), may be set equal to that (those) of the original image Isc.

For example, the method may further include: calculating a second auxiliary channel C2 according to color channels of the image Isc, calculating a plurality of second coefficients b[1] to b[N2] according to the intermediate image I (or a second intermediate image obtained by performing a second feature extraction on the image Isc) and the bases V[1] to V[N2], generating a second correction map m2 by summing the bases V[1] to V[N2] respectively weighted by the associated second coefficients b[1] to b[N2], and providing the corrected image I' further according to the second correction map m2, e.g., calculating a second corrected auxiliary channel C2' according to the second correction map m2 and the second auxiliary channel C2, and constructing a second corrected color channel c2' of the corrected image I' according to the second corrected auxiliary channel C2'. The second auxiliary channel C2 may be defined by (c2/c0), (c0/c2), log(c2/c0) or log(c0/c2), with channel c2 being another color channel of the image I, besides the color channels cb0 and c1. The color channels cb1 and c2 may be of different colors, e.g., the color channels cb1 and c2 may be different ones of a blue color channel and a red color channel of the image I. The quantity N2 may be equal to or different from the quantity N1 used to form the correction map m1.

The bases V[1] to V[N2] used in the color ratio based embodiment (where the second auxiliary channel C2 may be defined by (c2/c0) or (c0/c2)) may be different from the bases V[1] to V[N2] used in the logarithmic color ratio based embodiment (where the second auxiliary channel C2 may be defined by log(c2/c0) or log(c0/c2)). In other words, though both the two kinds of embodiments may form the second correction map by linear superposition of bases. Various embodiments may employ different bases.

In an embodiment, the second coefficients b[1] to b[N2] is solved to minimize a second target function H(B1,V2,I), which may include a third cost function H1(B1,V2,I) and a fourth cost function H2(B1,mB); e.g., H(B1,V2,I)=H1(B1, V2,I)+H2(B1,mB). The third cost function H1(B1,V2,I) may be formulated by a sum of weighted second local terms w2(x,y)*u2(x,y;A2,V2,I) over all pixels p(x,y) of the intermediate image I (or the second intermediate image), where a set of second candidate coefficients bc[1] to bc[N2] are collectively denoted as an input set B1, and the bases V[1] to V[N2] are collectively denoted an input set V2. Each second local term u2(x,y;A2,V2,I) is associated with a pixel of the intermediate image I (or the second intermediate image), and may be formulated by a q-th powered norm of a spatial gradient ∇ of a second pseudo corrected auxiliary channel Cd2' at the associated pixel p(x,y), i.e., u2(x,y;A2, V2,I)=$\|\nabla Cd2'(x, y;B1, V2,I)\|_p^q$. The second pseudo corrected auxiliary channel Cd2' is formulated according to the intermediate image I (or the second intermediate image) and a pseudo correction map mc2, which may be formulated by a sum of the bases V[1] to V[N2] respectively weighted by a set of input candidate coefficients bc[1] to bc[N2]; i.e., mc2=(bc[1]*V[1]+ . . . +bc[N2]*V[N2]).

For example, the second pseudo corrected auxiliary channel Cd2' may be calculated by Cd2'=Ca2*mc2 or Cd2'=(Ca2+mc2), depending on whether the second auxiliary channel Ca2 is defined by color ratio, e.g., Ca2=(ca2 /ca0) or (ca0/ca2 ), or by logarithmic color ratio, e.g., Ca2=log (ca2 /ca0) or log(ca0/ca2 ); wherein the channels ca2 and ca0 may be different color channels of the intermediate image I, the channel ca2 of the intermediate image I and the channel c2 of the image Isc may be of the same color. The auxiliary channel C1 and the second auxiliary channel C2 may be defined similarly or differently; e.g., the auxiliary channel C1 may be obtained by log(c1/c0), while the auxiliary channel C2 may be obtained by (c2/c0) or (c0/c2).

The weighting term w2(x,y) for weighting the second local terms u2(x,y;A2,V2,I) may be determined according to a second gradient term G2(x,y), which may be formulated based on $\|\nabla Ca2(x,y)\|_p$, $\|\nabla ca2(x,y)\|_p$, or w1(x,y), etc.

With the set B1 expressed as an N2 by 1 column vector listing the candidate coefficients bc[1] to bc[N2], and the set mB expressed as another N2 by 1 column vector listing reference coefficients mb[1] to mb[N2], The fourth cost function H2(B1,mB) may be formulated by H2(B1,mB)= Ld2*(B1−mB)$^T$*Vcd2*(B1−mB), wherein the term Ld2 may be a scalar balancing coefficient; as the vector difference (B2−mB) is also an N2 by 1 column vector, the term Vcd2 may be an N2 by N2 positive-definite or nonnegative-definite matrix. The set mB may represent a priori information.

The image Isc may be a full still photo or a full frame of a video; alternatively, the image Isc may be a portion of a full photo or frame; after the corrected image I' is obtained, the corrected image I' is used to correct the portion of the full photo or frame.

An objective of the invention is providing an apparatus capable of implementing the method of the invention; i.e., an apparatus for correcting color artifact of an image Isc provided by an image system. The apparatus including an access circuit, a correction controller and a corrector. The access circuit is capable of obtaining bases V[1] to V[N1]. The correction controller is coupled to the access circuit, and capable of: calculating coefficients a[1] to a[N1] according to the image Isc (or the intermediate image I), and generating a correction map m1. The corrector is coupled to the correction controller, and is capable of providing a corrected image I' by correcting the image Isc according to the correction map m1.

Similar to the method of the invention, the correction controller is further capable of calculating an auxiliary channel C1 according to color channels of the image Isc. The corrector is arranged to provide the corrected image I' by calculating a corrected auxiliary channel C1' according to the correction map m1 and the auxiliary channel C1, and constructing a corrected color channel c1' of the corrected image I' according to the corrected auxiliary channel C1'.

In a color ratio based embodiment, the correction controller is arranged to calculate the auxiliary channel C1 by dividing a predetermined color channel cb1 of the image Isc by a reference color channel cb0 of the image Isc; the corrector is arranged to calculate the corrected auxiliary channel C1' by multiplying the auxiliary channel C1 with an auxiliary correction map msc1 in association with the correction map m1, and to construct the corrected color channel c1' by multiplying the reference color channel cb0 of the image Isc with the corrected auxiliary channel C1'.

In an alternative logarithmic color ratio based embodiment, the correction controller is arranged to calculate the auxiliary channel C1 by a logarithm of a ratio dividing a predetermined color channel cb1 of the image Isc by a reference color channel cb0 of the image Isc; the corrector is arranged to calculate the corrected auxiliary channel C1' by summing the auxiliary channel C1 with the auxiliary correction map msc1, and to construct the corrected color channel c1' by multiplying the reference color channel cb0 of the image Isc with an inverse logarithm of the corrected auxiliary channel C1'.

In an embodiment, the correction controller is further capable of: calculating second coefficients b[1] to b[N2] according to the image Isc and bases V[1] to V[N2]; generating a second correction map m2 by summing the bases V[1] to V[N2] respectively weighted by the associated second coefficients b[1] to b[N2]. The corrector is arranged to provide the corrected image I' further according to the second correction map m2. For example, the correction controller is further capable of calculating a second auxiliary channel C2 according to color channels of the image Isc. The corrector is arranged to provide the corrected image I' further by calculating a second corrected auxiliary channel C2' according to the second correction map m2 and the second auxiliary channel C2; as well as constructing a second corrected color channel c2' of the corrected image I' according to the second corrected auxiliary channel C2'.

In an embodiment, the correction controller is arranged to solve the coefficients a[1] to a[N1] by minimizing a target function U(A1,V1,I) which receives a plurality of candidate coefficients ac[1] to ac[N1] (collectively represented by a set A1), an intermediate image I associated with the image Isc, and the bases V[1] to V[N1] (collectively represented by a set V1) as inputs.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1:
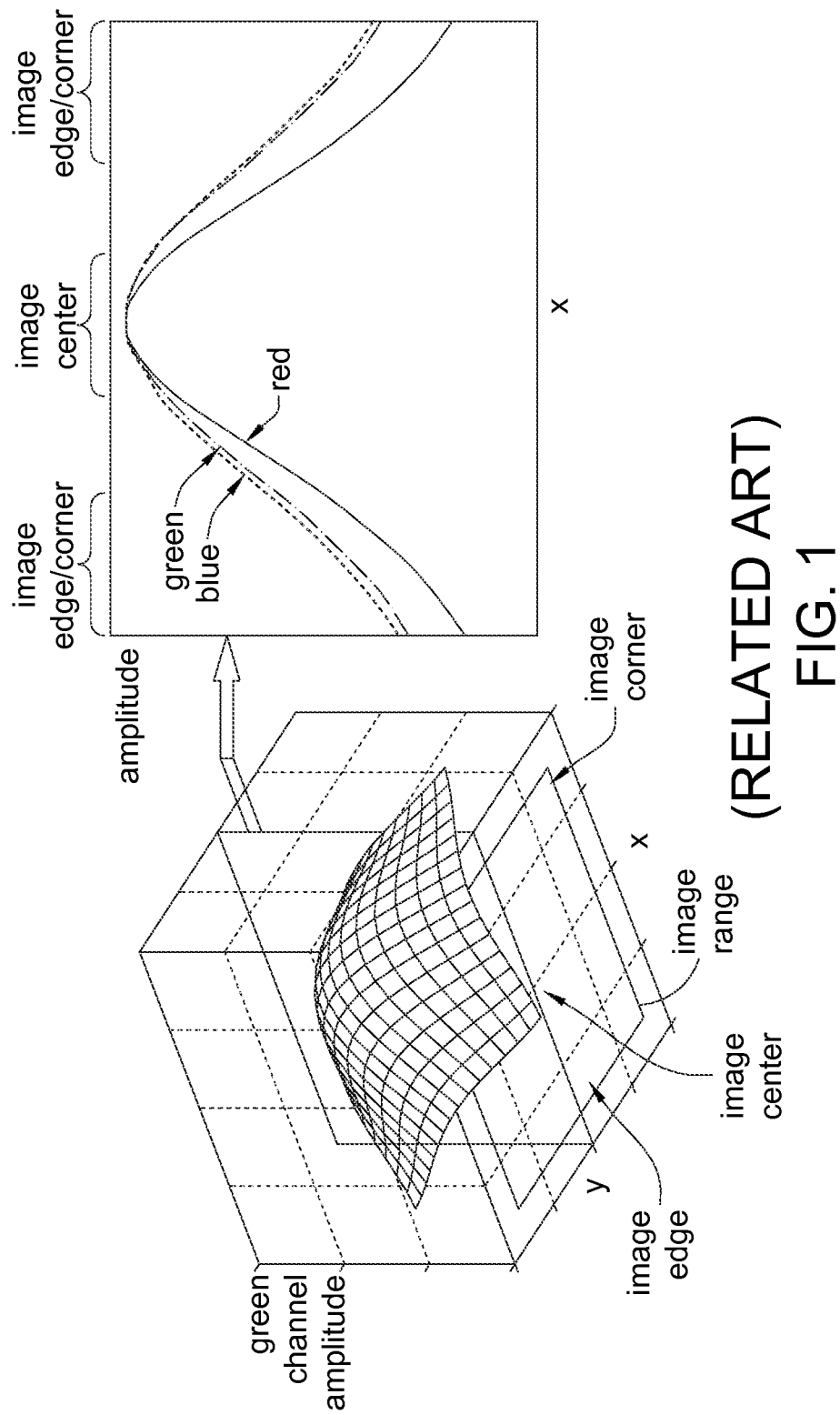
FIG. 1 illustrates color shading.

To initialize color shading correction of an image Isc, a chrominance channel transform may be first applied to prime color channels of the image Isc, so as to generate one or more auxiliary channels (e.g., chrominance channels) suitable for compensating color shading. The term "color channel" of an image may be used to represent a color component distribution of the image; for example, a green color channel of the image Isc may describe a green component for each pixel p(x,y) of the image Isc. Similarly, the term "channel" from "auxiliary channel" or "chrominance channel" of an image may be used to represent a distribution capable of providing a value for each pixel p(x,y) of the image; for example, an auxiliary channel C1 of the image Isc may provide a value C1 (x,y) for each pixel p(x,y) of the image Isc.

There are several available candidates for the chrominance channel transform, e.g., the auxiliary channel C1 may be obtained by R/B, G/B, R/G, log(R/B), log(G/B) or log(R/G) with R, G and B respectively being red, green and blue color channels of the image Isc. Furthermore, the auxiliary channel C1 may be a chrominance channel obtained by RGB-to-YUV or RGB-to-YCbCr transform, etc. Auxiliary (e.g., chrominance) channel(s) formed by logarithm of the ratios between two color channels, e.g., log(R/B) etc., may provide mathematical simplicities in problem formulation. But it should be appreciated that choosing either linear ratio of two color channels, e.g. R/B, etc., or logarithm of ratio of two color channels, e.g. log(R/B), etc., does not change nature of the problem, and both should be considered covered by the proposed invention. For example, in order to correct non-uniformity of color shading, greater gains for off-center pixels of the original image Isc and relatively less gains for central pixels of the image Isc may be respectively applied, so as to obtain a corrected image I'. Ratios between any two color channels at the center of the original image Isc may be preferred to substantially remain at the corrected image I'. Therefore, it may be convenient to perform color shading correction on auxiliary channel(s) defined based on ratios between two color channels, such as R/G, B/G, R/B, or their analytical forms, such as log(R/G), log(B/G), or log(R/B), etc. Various arithmetic definitions of the auxiliary channel(s) can be conceived and applied by persons skilled in the art without departing from the scope disclosed by the invention.

By applying the aforementioned chrominance transform on color channels of the original image Isc, an LCC channel set of a luminance-chrominance space of the image Isc can be obtained, where the channel L denote a luminance channel, and the two channels CC collectively represent two auxiliary channels C1 and C2. For example, with channels c0, cb1 and c2 being distinct three of the red, green and blue color channels of the image Isc, in a color ratio based embodiment, the channel C1 may equal (c1/c0), and the channel C2 may equal (c2/c0) or (c0/c2); equivalently, C1(x,y)=(c1(x,y)/c0(x,y)) and C2(x,y)=(c2(x,y)/c0(x,y)) or (c0(x,y)/c2(x,y)). On the other hand, in a logarithmic color ratio based embodiment, the channel C1 may be calculated by log(c1/c0), and C2 may be calculated by log(c2/c0) or log(c0/c2), equivalently, C1 (x,y)=log(c1(x,y)/c0(x,y)) and C2(x,y)=log(c2(x,y)/c0(x,y)) or log(c02(x,y)/c2(x,y)).

Figure 2:
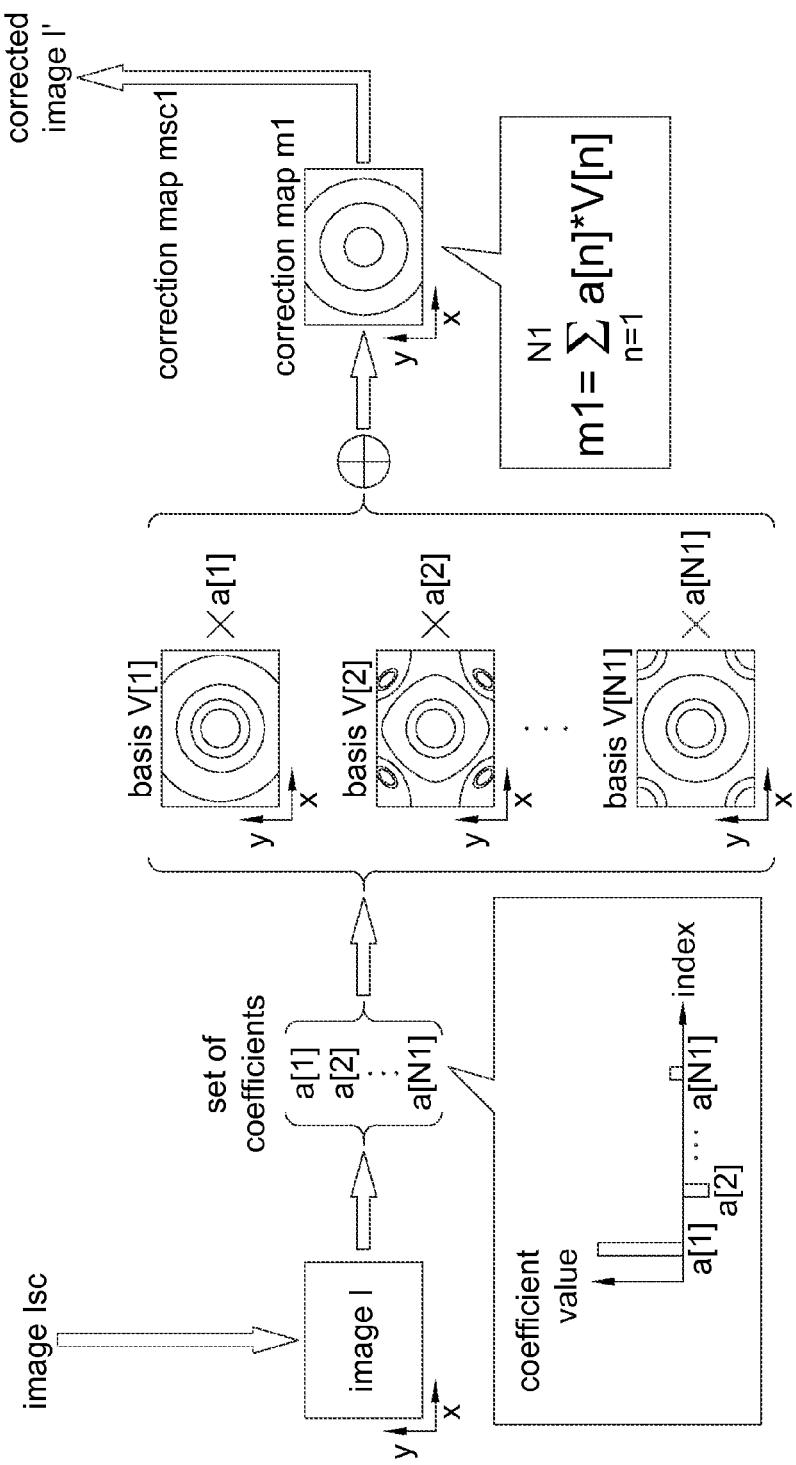
FIG. 2 and FIG. 3 illustrate color shading corrections according to an embodiment of the invention.

Please refer to FIG. 2 illustrating color shading correction according to an embodiment of the invention. Color artifacts of the image Isc may be corrected via an intermediate image I. The intermediate image I may be the image Isc itself, or be obtained by performing a feature extraction on the image Isc, such that dimensions of the image Isc and the intermediate image I may be different. For example, the intermediate image I may include xi*yi pixels and the image Isc may include xs*ys pixels, and the dimensions (xi,yi) and (xs,ys) may be different. For example, dimension of the image Isc may be greater than dimension of the image I, e.g., xs>xi and/or ys>yi. To obtain the intermediate image I, the feature extraction performed on the image Isc may include: scaling (e.g., up-scaling or down-scaling), re-sampling (e.g., up-sampling or down-sampling), and/or locally averaging (e.g., block averaging) the image Isc. For example, to obtain the intermediate image I by block averaging the image Isc, every xn*yn adjacent pixels of the image Isc may be grouped as a block, so there may be (xs/xn)*(ys/yn) blocks. Pixel values of each block may be averaged to obtain a single pixel value of the intermediate image I. The dimension (xi,yi) of the intermediate image I may equal (xs/xn, ys/yn).

According to the intermediate image I and a predetermined set of bases V[1] to V[N1], a set of coefficients a[1] to a[N1] can be calculated. Then, a correction map m1 can be generated by summing the bases V[1] to V[N1] respectively weighted by the coefficients a[1] to a[N1], e.g., m1=(a[1]*V[1]+ . . . +a[N1]*V[N1]). Hence, a corrected image I' may be provided by correcting the image Isc according to the correction map m1. In an embodiment, the corrected image I' is provided by calculating a corrected auxiliary channel C1' according to the correction map m1 and the auxiliary channel C1 of the image I, and constructing a corrected color channel c1' of the corrected image I' according to the corrected auxiliary channel C1'.

Each basis V[n] (for n=1 to N1) is capable of providing a basic correction value V[n](x,y) for each pixel p(x,y) of the intermediate image I, each coefficient a[n] is associated with the basis V[n]. Since the correction map m1 is synthesized by superposition of the products a[1]*V[n] to a[N1]*V[N1], the correction map m1 is capable of providing a correction value m1(x,y) for each pixel p(x,y) of the intermediate image I. In an alternative embodiment, the correction map m1 is the summation of: m1=V[0]+a[1]*V[1]+ . . . +a[N1]*V[N1], where a basis V[0] with constant coefficient 1 can be used in constructing the correction map.

The bases V[1] to V[N] used in the color ratio based embodiment may be different from the bases V[1] to V[N] used in the logarithmic color ratio based embodiment. In other words, though both the two kinds of embodiments may form the correction map m1 by linear superposition of bases. Various embodiments may employ different bases.

According to the correction map m1, an auxiliary correction map mscb1 may be provided, such that the auxiliary correction map mscb1 is capable of providing a correction value mscb1 (x,y) for each pixel p(x,y) of the image Isc. That is, while the correction map m1 may be of dimension xi*yi to provide xi*yi correction values for the xi*yi pixels of the intermediate image I, the auxiliary correction map mscb1 may be of dimension xs*ys to provide xs*ys correction values for the xs*ys pixels of the image Isc. In the embodiment where the intermediate image I is the image Isc, the auxiliary correction map mscb1 may be the correction map m1. In the embodiment where dimensions of the intermediate image I and the image Isc differ, the auxiliary correction map mscb1 may be derived from the correction map m1 by, for example, performing interpolation on the correction map m1.

As the original image Isc has three color channels c0, cb1 and c2, the corrected image I' also has three (corrected) color channels c0', c1' and c2'. In an embodiment, the color channels cb1 and c1' may be of the same color, e.g., red or blue; similarly, the color channels cb0 and c0' may be of the same color, e.g., green, and the color channels c2 and c2' may be of the same color, i.e., the color other than the colors of the color channels cb0 and c1.

The chrominance channel transform associating the color channels c0, cb1 and/or c2 to the auxiliary channel C1 of the image Isc may also be applied to the color channels c0', c1' and c2' of the corrected image I', so as to associate the color channels c0', c1' and/or c2' to the auxiliary channel C1'. Accordingly, the corrected color channel c1' can be constructed by obtaining the corrected auxiliary channel C1'. Likewise, the relation associating the channels c0, cb1 and/or c2 to the auxiliary channel C2 of the image Isc may be exploited to define an identical relation for associating the channels c0', c1' and/or c2' to another auxiliary channel C2' of the image I'. As color channel(s) may be transformed to auxiliary channel(s) by the chrominance channel transform, corrected auxiliary channel(s) may be transformed back to corrected color channel(s) by an inverse transform of the chrominance channel transform.

In the color ratio based embodiment where the channel C1 equals (c1/c0), the corrected auxiliary channel C1' may be similarly defined by (c1'/c0'). In such embodiment, the corrected auxiliary channel C1' may be calculated by multiplying the auxiliary channel C1 with the auxiliary correction map msc1, i.e., C1'=C1*msc1, or equivalently, C1'(x,y)=(C1(x,y)*msc1(x,y)). Accordingly, the corrected color channel c1' can be obtained by: c1'=(c0'*C1')=(c0'*(c1/c0)*msc1). If the color channel c0' of the corrected image I' is set equal to the color channel cb0 of the original image Isc, then the color channel c1' can be constructed by c1'= (c1*msc1).

In the logarithmic color ratio based embodiment where the channel C1 equals log(c1/c0), the corrected auxiliary channel C1' may be similarly defined by log(c1'/c0'). In such embodiment, the corrected auxiliary channel C1' may be calculated by summing the auxiliary channel C1 and the auxiliary correction map m1, i.e., C1'=C1+msc1, or equivalently, C1'(x,y)=(C1(x,y)+mscb1 (x,y)). Accordingly, the corrected color channel c1' can be obtained by c1'=c0'*exp (C1')=c0'*(c1/c0)*exp(msc1), where exp(.) is an inverse function of log(.). If the color channel c0' of the corrected image I' is set equal to the color channel cb0 of the original image Isc, then the color channel c1' can be constructed by c1'=(c1*exp(msc1)).

As shown in following equation eq1a, in an embodiment, the coefficients a[1] to a[N1] are so solved that they can minimize a target function U(A1,V1,I), which receives a set of candidate coefficients ac[1] to ac[N1] (collectively denoted as a set A1), the bases V[1] to V[N1] (collectively denoted as a set V1) and the intermediate image I as inputs.

$$\underset{A1}{\operatorname{argmin}} U(A1, V1, I) \qquad \text{(eq 1a)}$$

That is, among different sets of candidate coefficients ac[1] to ac[N1], if one of those sets can minimize the target function U(A1,V1,I) when the set of candidate coefficients is input to the target function U(A1,V1,I) as the set A1, then the candidate coefficients of the set are chosen to be the coefficients a[1] to a[N1].

The target function U(A1,V1,I) may include a first cost function U1(A1,V1,I) and a second cost function U2(A1, mA); e.g., U(A1,V1,I)=U1(A1,V1,I)+U2(A1,mA).

In an embodiment, the first cost function U1(A1,V1,I) is capable of indicating uniformity over spatially smooth-varying regions of a pseudo corrected auxiliary channel Cd1', which is a corrected result of an auxiliary channel Ca1 when the candidate coefficients in the set A1 is applied. The chrominance channel transform, which is applied to the color channel cb1 of the image Isc to obtain the auxiliary channel C1, may also be applied to a color channel ca1 of the intermediate image I to obtain the auxiliary channel Ca1. For example, the auxiliary channel Ca1 may be formulated by Ca1=(ca1/ca0) or log(ca1/ca0) respectively in the color ratio based embodiment or the logarithmic color ratio based embodiment, with channels ca1 and ca0 being color channels of the intermediate image I, wherein the color channels ca1 and cb1 may be of the same color, and the color channels ca0 and cb0 may be of the same color. The pseudo corrected auxiliary channel Cd1' is formulated according to the intermediate image I and a pseudo correction map mc1, where the pseudo correction map mc1is formulated by a sum of the bases V[1] to V[N1] respectively weighted by the input candidate coefficients ac[1] to ac[N1]; i.e., mc1=(ac[1]*V[1]+ . . . +ac[N1]*V[N1]).

That is, for a set of candidate coefficients ac[1] to ac[N1] input to the first cost function U1(A1,V1,I), the pseudo correction map mc1may be formed by mc1= (ac[1]*V[1]+ . . . +ac[N1]*V[N1]), and is then exploited to correcting the auxiliary channel Ca1 of the intermediate image I, so as to generate a corresponding pseudo corrected auxiliary channel Cd1'; if uniformity over spatially smooth-varying regions of the resultant channel Cd1' is minimized, the set of candidate coefficients ac[1] to ac[N1] is selected to be the coefficients a[l] to a[N1].

As shown in following equation eq1b, the first cost function U1(A1,V1,I) may be formulated by a sum of weighted local terms w1(x,y)*u1(x,y;A1,V1,I) accumulated over all pixels p(x,y) of the intermediate image I.

$$U1(A1, V1, I) = \sum_{(x,y) \in I} w1(x, y) * u1(x, y; A1, V1, I) \qquad \text{(eq 1b)}$$

As shown in following equation eq1c, each local term u1(x,y;A1,V1,I) is associated with a pixel p(x,y) of the intermediate image I, and may be formulated by a q-th powered norm of a spatial gradient $\nabla$ of the pseudo corrected auxiliary channel Cd1' at the associated pixel p(x,y), wherein the norm $\|.\|_p$ may be a vector p-norm.

$$u1(x,y;A1,V1,I) = \|\nabla Cd1'(x,y;A1,V1,I)\|_p^q \qquad \text{(eq1c)}$$

The spatial gradient operator $\nabla$ may be a numeric operator; for example, $\nabla$ (Cd1'(x,y)) may include an x-direction component and a y-direction component, the former involves a difference (Cd1'(x+dx,y)−Cd1'(x,y)) or (Cd1'(x, y)−Cd1'(x−dx,y)), and the latter involves a difference (Cd1'(x,y+dy)−Cd1'(x,y) or (Cd1'(x,y)−Cd1'(x,y−dy)), with dx and dy being x-direction distance and y-direction distance between two adjacent pixels.

As each local term u1(x,y;A1,V1,I) is weighted by a weighting term w1(x,y), the weighting term w1(x,y) is exploited to exclude or suppress a local term u1(x,y;A1,V1, I) from the first cost function U1(A1,V1,I) if the associated pixel p(x,y) of the intermediate image I is located at regions of high spatial variation. Accordingly, the weighting term w1(x,y) may be determined according to a gradient term G1(x,y) (not shown in FIG. 2), which may be equal to (or be calculated based on) $\|\nabla Ca1(x, y)\|_p$, $\|\nabla ca1(x,y)\|_p$, $\|\nabla ca0(x, y)\|_p$ or $\|\nabla L(x,y)\|_p$, where the term L(x,y) represents luminance of the intermediate image I at pixel p(x,y). In an embodiment, if the gradient term G1(x,y) at a given pixel p(x,y) is greater than a threshold, then the weighting term w1(x,y) for the pixel p(x,y) is set to 0; if the gradient term G1(x,y) is less than the threshold, then the weighting term w1(x,y) is set to 1. That is, the weighting term w1(x,y) may be selectively set to two different constants 0 and 1 according to whether the gradient term G1(x,y) is less than a threshold. In an alternative embodiment, value of each weighting term w1(x,y) is set between 0 and 1, inclusive; for a greater gradient term G1(x,y), the weighting term w1(x,y) is assigned to a smaller value, i.e., a value closer to 0. The weighting terms w1(x,y) of all pixels p(x,y) are collectively referred to as a weighting map w1.

In an embodiment, the principle for correcting the channel Ca1 to the channel Cd1' by the pseudo correction map mc1may be identical to the principle for correcting the channel C1 to the channel C1' by the auxiliary correction map msc1. Accordingly, in the color ratio based embodiment where the channels C1 and C1' equal (c1/c0) and (C1*msc1), the pseudo corrected auxiliary channel Cd1' may be similarly formulated by Cd1'=(Ca1*mc1). In the logarithmic color ratio embodiment where C1=log(cl/c0) and C1'=(C1+msc1), the pseudo corrected auxiliary channel Cd1' may be similarly formulated by Cd1'=(Ca1+mc1).

As previously mentioned, besides the first cost function U1(A1,V1,I), the target function U(A1,V1,I) may also include the second cost function U2(A1,mA) indicative of a difference between the set A1 of the candidate coefficients ac[1] to ac[N1], and a set mA of reference coefficients ma[1] to ma[N1]. With the set A1 expressed as an N1 by 1 column vector listing the candidate coefficients ac[1] to ac[N1], and the set mA expressed as another N1 by 1 column vector listing the reference coefficients ma[1] to ma[N1], the second cost function U2(A1,mA) may be expressed by following equation eq1d.

$$U2(A1,mA) = Ld1*(A1-mA)^T*Vcd*(A1-mA) \qquad \text{(eq1d)}$$

Wherein the term Ld1 may be a balancing coefficient; as the vector difference (A1−mA) is also an N1 by 1 column vector, the term Vcd may be an N1 by N1 positive-definite or nonnegative-definite matrix. The set mA may represent a priori information; for example, while calculating a current set A(t) of the coefficients a[1] to a[N1 ] by equations eq1a to eq1d for a current correction map m1 (t) of a current intermediate image I(t), the set mA be an average, or weighted sum, of several preceding sets of coefficients, such as A(t−3*dt), A(t−2*dt) and A(t−1*dt) respectively utilized to obtain the correction maps m1(t−3*dt), m1(t−2*dt) and m1(t−1*dt) for elapsed intermediate images I(t−3*dt), I(t−2*dt) and I(t−1*dt).

That is, the second cost function U2(A1,mA) may indicate a normalized square distance of the candidate coefficients ac[1] to ac[N1] from the population mean (the set mA) as determined by color shading of preceding image(s). The purpose of the second cost function U2(A1,mA) is to use a priori knowledge of the distribution of the coefficients to constrain the solution (the current set A(t)), so the coefficients a[1] to a[N1] of the current set A(t), which minimize the target function U(A1,V1,I(t)) of the current intermediate image I(t), are within reasonable ranges as predicted by the a priori knowledge. It may be important to regularize the target function U(A1,V1,I(t)) by a smoothing term, such as the second cost function U2(A1,mA), so a small change in inputs of the target function U(A1,V1,I(t)) will not cause a large change in solution. One important aspect of the invention is to deal with unit-to-unit variations in mass production. Use of a priori statistical knowledge as a constraint is therefore a flexible and effective means for achieving that objective.

The equation eq1a for calculating the coefficients a[1] to a[N1] to form the correction map m1 either has a closed form (analytic form) solution, or can be solved by iteration or other optimization algorithms.

Besides the embodiment where the correction map m1=a[1]*V[1]+ . . . +a[N1]*V[N1], in an alternative embodiment, the correction map m1 may be expressed by m1=a0*V[0]+a[1]*V[1]+ . . . +a[N1]*V[N1], wherein an additional basis V[0] weighted by a constant coefficient a0 may be jointly used in constructing the correction map m1. For example, the coefficient a0 may be constantly set equal to 1; the key issue is that the coefficient a0 for weighting the basis V[0] is not subject to optimization of target function.

As previously discussed, in an embodiment, the intermediate image I (as well as the bases V[.], the correction map m1, and the channels Cd1', Ca1 and ca0 to ca2 related to the equations eq1a to eq1d) may be of a smaller dimension (xi,yi), comparing to the dimension (xs,ys) of the image Isc (as well as the image I', the auxiliary correction map msc1, and the channels C1, C1' and c0 to c2). Such arrangement may reduce computation efforts and simplify implementation complexity for solving the coefficients a[1] to a[N1]. That is, the image Isc to be corrected may be transformed to a smaller intermediate image I to solve the coefficients a[1] to a[N1] and provide the correction map m1 of smaller dimension, then the smaller correction map m1 may be augmented, e.g., by interpolating the correction map m1, to a larger auxiliary correction map mscb1 to correct the image Isc.

In an embodiment of color shading correction, a single auxiliary channel C1 is calculated to solve a single set of the coefficients a[1] to a[N1], so a single correction map (m1 or msc1) and a single corrected auxiliary channel C1' can be obtained to accordingly correct a single color channel c1' (e.g., a red color channel) of the corrected image I', while other color channels (e.g., blue and green color channels) of the corrected image I' may be set equal to those of the original image Isc; alternatively, the channel C2' of the image I' may be set equal to the channel C2 of the image Isc.

In an alternative embodiment of color shading correction, multiple auxiliary channels, e.g., C1 and C2, are calculated to respectively solve multiple sets of the coefficients, e.g., a[1] to a[N1] and b[1] to b[N2], so multiple correction maps, e.g., m1 (or msc1) and m2 (or msc2), as well as multiple corrected auxiliary channels, e.g., C1' and C2', can be obtained to accordingly correct multiple color channels, e.g., c1' and c2' of the corrected image I', while rest color channel(s) of the corrected image I', if any (e.g., the green color channel), can be set equal to that (those) of the original image Isc. Please refer to FIG. 3 illustrating a color shading correction according to an embodiment of the invention, where two correction maps m1 and m2 are calculated to correct two auxiliary channels C1 and C2 (not shown) of the original image Isc, and hence to generate two corrected auxiliary channels C1' and C2' (not shown) for constructing the corrected image I' (not shown).

Figure 3:
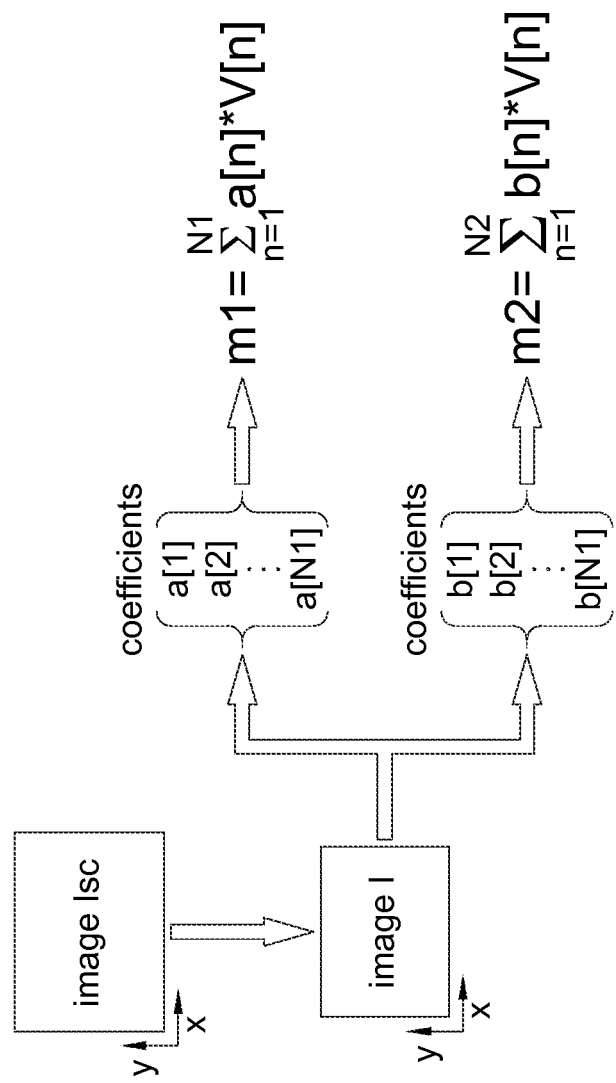

Besides calculating the coefficients a[1] to a[N1] and the correction map m1 like FIG. 2, FIG. 3 further includes: calculating a plurality of second coefficients b[1] to b[N2] according to the intermediate image I (or a second intermediate image obtained by performing a second feature extraction on the image Isc) and the bases V[1] to V[N2], generating the second correction map m2 by summing the bases V[1] to V[N2] respectively weighted by the associated second coefficients b[1] to b[N2], and providing the corrected image I' further according to the second correction map m2, e.g., obtaining a second auxiliary correction map msc2 by interpolating the correction map m2, and calculating the second corrected auxiliary channel C2' according to the second correction map m2 (or the second auxiliary correction map msc2) and the second auxiliary channel C2, and constructing the second corrected color channel c2' of the corrected image I' according to the second corrected auxiliary channel C2'.

The quantity N2 may be equal to or different from the quantity N1 used to form the correction map m1. For example, there may be a total quantity N_total of bases V[1] to V[N_total], the quantity N1 is less than or equal to the total quantity N_total, and the quantity N2 is also less than or equal to the total quantity N_total. That is, correction maps for different auxiliary channels may by synthesized by different or identical subsets of all available bases.

The bases V[1] to V[N2] used in the color ratio based embodiment (where the second auxiliary channel C2 may be defined by (c2/c0) or (c0/c2)) may be different from the bases V[1] to V[N2] used in the logarithmic color ratio based embodiment (where the second auxiliary channel C2 may be defined by log(c2/c0) or log(c0/c2)). In other words, though both the two kinds of embodiments may form the second correction map by linear superposition of bases. Various embodiments may employ different bases.

As shown in equation eq2a, the second coefficients b[1] to b[N2] is solved to minimize a second target function H(B1, V2,I)

$$\underset{B1}{\mathrm{argmin}}\, H(B1, V2, I) \qquad (\text{eq 2a})$$

The second target function H(B1,V2,I) may include a third cost function H1(B1,V2,I) and a fourth cost function H2(B1, mB); e.g., H(B1,V2,I)=H1(B1,V2,I)+H2(B1,mB).

As expressed in following equation eq2b, the third cost function H1(B1,V2,I) may be formulated by a sum of weighted second local terms w2(x,y)*u2(x,y;B1,V2,1) over all pixels p(x,y) of the intermediate image I, where a set of second candidate coefficients bc[1] to bc[N2] are collectively denoted as the input set B1, and the bases V[1] to V[N2] are collectively denoted an input set V2.

$$H1(B1, V2, I) = \sum_{(x,y) \in I} w2(x, y) * u2(x, y; B1, V2, I) \qquad (\text{eq 2b})$$

As described by following equation eq2c, each second local term u2(x,y;B1,V2,I) is associated with a pixel of the intermediate image I, and may be formulated by a q-th powered norm of a spatial gradient ∇ of a second pseudo corrected auxiliary channel Cd2' at the associated pixel p(x,y).

$$U2(x,y;A2,V2,I)=\|\nabla Cd2'(x,y;B1,V2,I)\|_p^q \quad (eq2c)$$

The pseudo corrected auxiliary channel Cd2' is formulated according to the intermediate image I and a pseudo correction map mc2, which may be formulated by a sum of the bases V[1] to V[N2] respectively weighted by a set of input candidate coefficients bc[1] to bc[N2]; i.e., mc2=(bc[1]*V[1]+ . . . +bc[N2]*V[N2]).

For example, the second pseudo corrected auxiliary channel Cd2' may be calculated by Cd2'=Ca2*mc2 or Cd2'=(Ca2+mc2), depending on whether the second auxiliary channel C2 is obtained by color ratio, e.g., C2=(c2/c0) or (c0/c2), or by logarithmic color ratio, e.g., C2=log(c2/c0) or log(c0/c2); wherein the color channels ca2 and c2 may be of the same color. Note that the auxiliary channels Ca1 and Ca2 may be defined similarly or differently; e.g., the auxiliary channel Ca1 may be obtained by log(cA1/ca0), while the auxiliary channel Ca2 may be obtained by (ca2 /ca0) or (ca0/ca2 ).

Similar to setting of the weighting term w1(x,y), the weighting term w2(x,y) for weighting the second local terms u2(x,y;A2,V2,I) may be determined according to a second gradient term G2(x,y), which may be equal to $\|\nabla Ca2(x,y)\|_p$, $\|\nabla ca2 (x,y)\|_p$ or w1(x,y), etc.

With the set B1 expressed as an N2 by 1 column vector listing the candidate coefficients bc[1] to bc[N2], and the set mB expressed as another N2 by 1 column vector listing reference coefficients mb[1] to mb[N2], The fourth cost function H2(B1,mB) may be formulated by following equation eq2d.

$$H2(B1,mB)=Ld2*(B1-mB)^T*Vcd2*(B1-mB) \quad (eq2d)$$

Wherein the term Ld2 may be a scalar balancing coefficient; as the vector difference (B2-mB) is also an N2 by 1 column vector, the term Vcd2 may be an N2 by N2 positive-definite or nonnegative-definite matrix. The set mB may represent a priori information; for example, while calculating a current set B(t) of the coefficients b[1] to b[N1] by equations eq2b to eq2d for a current correction map m2(t) of a current intermediate image I(t), the set mB be an average, or weighted sum, of several preceding sets of coefficients, such as B(t−3*dt), B(t−2*dt) and B(t−1*dt) respectively utilized to obtain the correction maps m2(t−3*dt), m2(t−2*dt) and m2(t−1*dt) for elapsed intermediate images I(t−3*dt), I(t−2*dt) and I(t−1*dt).

Besides calculating the correction map m2 by solving the coefficients b[1] to b[N2] corresponding to the bases V[1] to V[N2], other algorithms can be utilized to obtain the correction map m2. For example, the correction map m2 may be obtained by selecting among several candidate correction maps according to illuminant identification, or according to a property (such as norm, spatial mean, spatial variance, spatial maximum, minimum, comparison of maximum and minimum, spatially low-pass filtered result, spatially band-pass filtered result, spatially high-pass filtered result, or spatial spectrum, etc) of the correction map m1, e.g., if the property satisfies a first condition (e.g., in a first range), then a first candidate correction map is selected as the correction map m2; if the property satisfies a second condition, then a second candidate correction map is selected as the correction map m2, etc. Alternatively, if the property of the correction map m1 satisfies a first condition, then the correction map m2 is calculated by solving equation eq2a; if the property of the correction map m1 satisfies a second condition, then the correction map m2 is selected from one or more candidate correction map(s).

Besides the embodiment where the correction map m2=b[1]*V[1]+ . . . +b[N2]*V[N2], in an alternative embodiment, the correction map m2 may be expressed by m2=b0*V[0]+b[1]*V[1]+ . . . +b[N2]*V[N2], wherein an additional basis V[0] weighted by a constant coefficient b0 may be jointly used in constructing the correction map m2. For example, the coefficient b0 may be constantly set equal to 1. The coefficient b0 for weighting the basis V[0] is not subject to optimization of the second target function.

In the embodiments of FIG. 2 and FIG. 3, the image Isc may be a full still photo or a full frame of a video; alternatively, the image Isc may be a portion (e.g., a center portion or a user-defined portion) of a full photo or frame; after the corrected image I' is obtained, the corrected image I' is used to correct the portion of the full photo or frame.

In aforementioned embodiments of FIG. 2 and FIG. 3, the (numeric) gradient operator ∇ adopted in the local term u1(x,y;A1,V1) may be defined the same as or differently from those utilized in the weighting term w1(x,y), in the second local term u2(x,y;A2,V2) and/or in the second weighting term w2(x,y). Various replacements for either one of the gradient operators may be: spatial variation, statistical variance, spatial difference of adjacent partitioned sub-blocks or pixels, spatial spectrum analysis of locally windowed area, etc.

In an embodiment, the coefficients a[1] to a[N1] for the bases V[1] to V[N1] are solved without other a priori information, except information obtained from the original image Isc and the bases V[1] to V[N1], as well as the set mA. That is, each coefficient a[n] is assumed to range from negative infinite to positive infinite. Alternately, when solving the coefficients a[1] to a[N1] for the bases V[1] to V[N1], additional a priori information may be provided; for example, a predetermined range R[n] can be provided to suggest possible values of each coefficient a[n], and/or, a set of expected values of the coefficients a[1] to a[N1] can be provided as initial guess, so minimization of equation eq1a can accordingly converge faster and/or correctly (e.g., without being trapped in a local minimum). Each range R[n] may provide: a single finite upper bound, a single finite lower bound, or both the upper and the lower bounds for the coefficient a[n]. For one or some of the coefficients a[1] to a[N1], the accompanying range(s) may extend from negative infinite to positive infinite. Similarly, while solving equation eq2a for the coefficients b[1] to b[N1] of the bases V[1] to V[N2], additional a priori information may also be provided.

Figure 4:
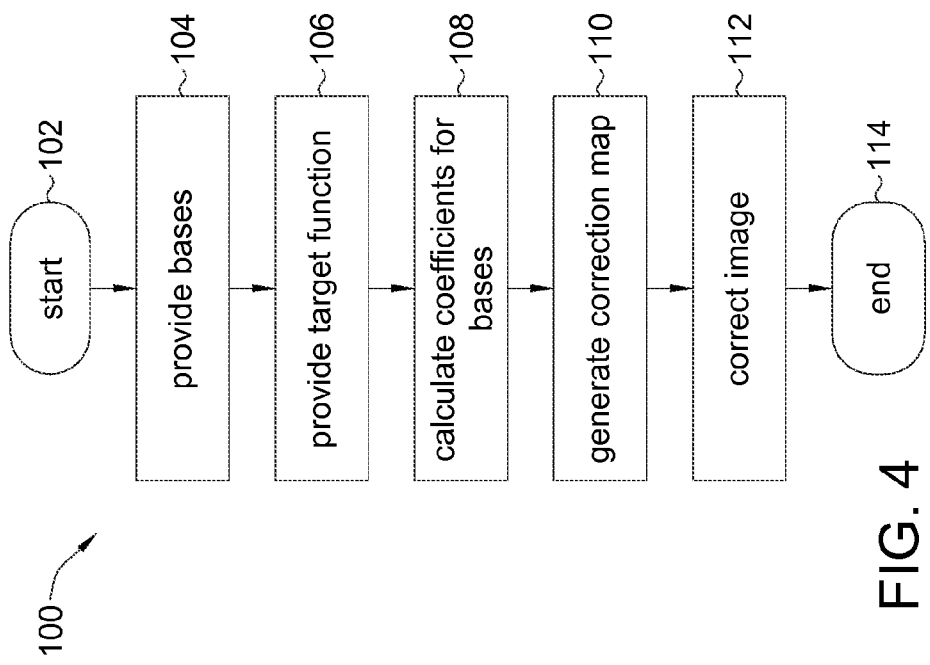
FIG. 4 illustrates a color shading correction flowchart according to an embodiment of the invention.

Please refer to FIG. 4 illustrating an image correction flowchart 100 according to an embodiment of the invention; using the embodiment of FIG. 2 as an example, main steps of the flowchart 100 may be described as follows.

Step 102: start the flowchart 100 to correct an image Isc.

Step 104: provide a plurality of bases V[1] to V[N1].

Step 106: provide a target function U(A1,V1,I) which is to be minimized to solve a set of coefficients a[1] to a[N1]. The target function preparation may include: obtaining an auxiliary channel Ca1 by a chrominance channel transform, and calculating a weighting map w1 for providing a weighting term w1(x,y) (equation eq1b) for each pixel p(x,y) of the intermediate image I. For example, the weighting term w1(x,y) for a pixel p(x,y) may be determined according to a gradient term G1(x,y), where the gradient term may be calculated based on a spatial gradient of the channel Ca1 at the pixel p(x,y) of the intermediate image I. In an embodiment, the weighting term w1(x,y) is selectively set to two different constants (e.g., 1 or 0) according to whether the gradient term is less than a threshold.

Step 108: calculate a plurality of coefficients a[1] to a[N1] by solving equation eq1a (i.e., by minimizing the target function U(A1,V1,I)), each coefficient a[n] associated with the basis V[n].

Step 110: generate a correction map m1 by summing the bases V[1] to V[N1] respectively weighted by associated coefficients a[1] to a[N1], e.g., m1=(a[1]*V[1]+ . . . +a[N1] *V[N1]).

Step 112: correct the image Isc according to the correction map m1, so as to provide a corrected image I'. For example, an auxiliary correction map mscb1 may be derived from the correction map m1, so a corrected auxiliary channel C1' may be calculated according to the auxiliary correction map mscb1 and the channel C1. In a color ratio based embodiment where the channel C1 equals a ratio (c1/c0) between two color channels cb0 and cb1 of the image Isc, a channel C1' may be calculated by C1'=C1*msc1; in a logarithmic color ratio based embodiment where the channel C1 equals a logarithmic ratio log(c1/c0), the channel C1' may be calculated by C1'=(C1+msc1). According to the resultant channel C1', a corrected color channel c1' is constructed to form a color channel of the corrected image I'.

Step 114: end the flowchart 100.

In the embodiment of FIG. 4, a single correction map m1 is obtained to provide a single corrected auxiliary channel C1' (and therefore a corrected color channel c1') for the corrected image I'. In an alternative embodiment where two (or more) corrected auxiliary channels, e.g., C1' and C2', are exploited, steps 106, 108 and 110 may be repeated two (or more) times to respectively provide two (or more) target functions U(A1,V1,I) and H(B1,V2,I) (FIG. 3), obtain two (or more) sets of coefficients a[1] to a[N1] and b[1] to b[N2], generate two (or more) correction maps m1 and m2 (and therefore the auxiliary correction maps mscb1 and msc2), and accordingly calculate the two (or more) corrected auxiliary channels C1' and C2' for constructing the corrected image I' in step 112. Alternatively, multiple target functions may be prepared concurrently, multiple sets of coefficients may be obtained concurrently, and/or multiple correction maps may be generated concurrently.

Figure 5:
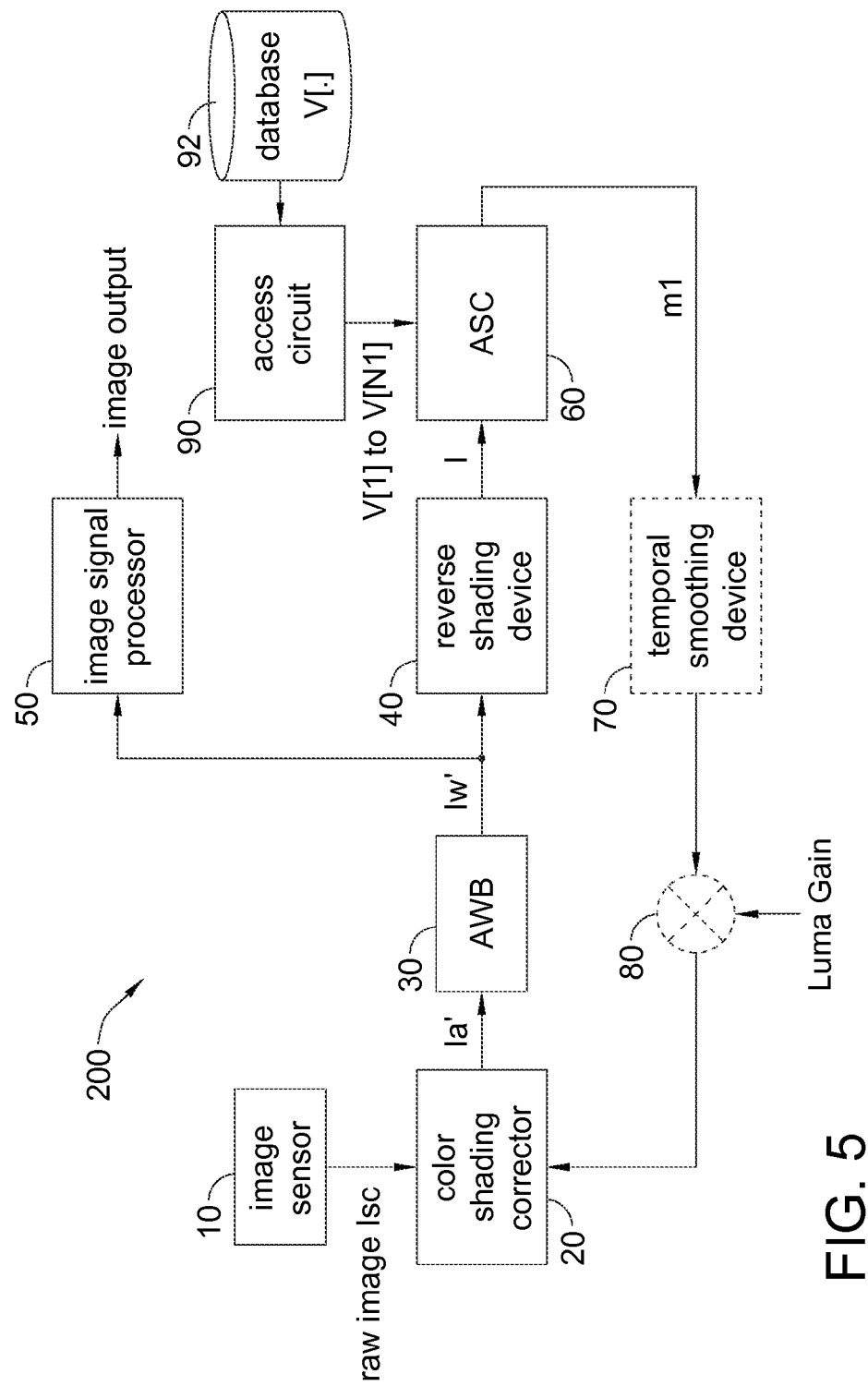
FIG. 5 schematically illustrates an image system integrated with color shading correction apparatus according to an embodiment of the invention.

Please refer to FIG. 5 illustrating an image system 200 according to an embodiment of the invention. The image system 200 includes an image sensor 10, a color shading corrector 20, an auto white balance module (AWB) 30, a reverse shading device 40, an image signal processor 50, an adaptive shading correction controller (ASC) 60, an optional temporal smoothing device 70, an optional multiplier 80, and an access circuit 90 for accessing a database 92. The corrector 20, the correction controller 60 and the access circuit 90 may form an image correction apparatus embedded in the image system 200; the apparatus is capable of implementing the embodiment shown in FIG. 2 or FIG. 3.

The image sensor 10 captures an input image as a raw image Isc, which is transmitted to the corrector 20 for color shading correction. The corrector 20 is coupled to the image sensor 10, and capable of generate a corrected image Ia' by correcting an intermediate image I according to a correction map m1, wherein the intermediate image I may be associated with the image Isc. The AWB 30 is coupled to the corrector 20, and capable of performing auto white balance on the corrected image Ia' to provide an image Iw'. The image signal processor 50 is coupled to the AWB 30, and capable of performing other required image processing on the image Iw' to generate an image output to be displayed on a screen (not shown). The reverse shading device 40 is also coupled to the AWB 30, and capable of performing reverse color shading correction on the image Iw' to restore the original intermediate image I, e.g. applying an inverse correction map on the output Iw', since the image Iw' has been color shading corrected by the corrector 20.

The access circuit 90 is coupled to the correction controller 60, and capable of obtaining a plurality of bases V[1] to V[N1], each basis V[n] is capable of providing a basic correction value V[n](x,y) for each pixel p(x,y) of the image I. For example, multiple bases V[.], including the bases V[1] to V[N1], may be stored in a nonvolatile database 92 (e.g., ROM, EEPROM or flash memory) or be loaded into a volatile database 92 (e.g., SRAM or DRAM), and the access circuit 90 is capable of reading the database 92 to obtain the bases. The correction controller 60 is coupled to the reverse shading device 40 and the access circuit 90, and capable of calculating coefficients a[1] to a[N1] according to the intermediate image I and the bases V[1] to V[N1], and generating the correction map m1 by summing the bases V[1] to V[N1] respectively weighted by the coefficients a[1] to a[N1].

The bases V[1] to V[N] used in the color ratio based embodiment may be different from the bases V[1] to V[N] used in the logarithmic color ratio based embodiment. In other words, though both the two kinds of embodiments may form the correction map by linear superposition of bases. Various embodiments may employ different bases.

The temporal smoothing device 70 is coupled to the correction controller 60, and capable of performing temporal smoothing on the correction map m1 to prevent the correction map m1 from varying too severely within a short time, since temporally rapidly varying correction map may cause flickering on the output image of the image signal processor 50. For example, a current correction map generated for a current image may be averaged by weighted previous correction map(s) generated for previous image(s). The multiplier 80 is coupled between the correction controller 60 and the corrector 20, and capable of multiplying a luma gain on the correction map provided by the correction controller 60. One or both of the temporal smoothing device 70 and the multiplier 80 may be omitted. The temporal smoothing device 70 may implement (or support) the second (and/or the fourth) cost function U2(A1,mA) in equation eq1d (and/or H2(B1,mB) in equation eq2c).

For color shading correction, the correction controller 60 is further capable of calculating an auxiliary channel C1 according to color channel(s) of the image Isc, and the corrector 20 is arranged to provide the corrected image I' by: calculating a corrected auxiliary channel C1' according to the correction map m1 and the auxiliary channel C1, and constructing a corrected color channel c1' of the corrected image I' according to the corrected auxiliary channel C1'.

To implement the color ratio based embodiment, the correction controller 60 is capable of calculating the auxiliary channel C1 by dividing a color channel cb1 of the image Isc by another color channel cb0 of the image Isc, and the corrector 20 is capable of calculating the corrected auxiliary channel C1' by multiplying the auxiliary channel C1 with the auxiliary correction map msc1, and capable of constructing the corrected color channel c1' by multiplying a color channel c0' with the corrected auxiliary channel C1'.

To implement the logarithmic color ratio based embodiment, the correction controller 60 is capable of calculate the auxiliary channel C1 by: taking a logarithm of a ratio dividing a color channel cb1 of the image Isc by another color channel cb0 of the image Isc; the corrector 20 is capable of calculating the corrected auxiliary channel C1' by summing the auxiliary channel C1 and the auxiliary correction map msc1, and capable of constructing the corrected color channel c1' by multiplying a color channel c0' with an inverse logarithm of the corrected auxiliary channel C1'.

If necessary, the image system 200 may adopt the multi-channel correction scheme exemplarily shown in FIG. 3. In addition to the coefficients a[1] to a[N1] for generating the correction map m1, the correction controller 60 may further be capable of: calculating other set(s) of coefficients according to the intermediate image I and the bases, e.g., an additional set of coefficients b[1] to b[N2] for the bases V[1] to V[N2], and capable of generating additional correction map(s) by summing the bases respectively weighted by the associated set(s) of coefficients, e.g., generating a correction map m2 by summing b[1]*V[1] to b[N2]*V[N2]. Accordingly, the corrector 20 is capable of providing the corrected image I' according to multiple correction maps, e.g., the correction maps m1 and m2. The access circuit 90 is capable of reading associated bases for different set(s) of coefficients, e.g., obtaining the bases V[1] to V[N2] for the coefficients b[1] to b[N2].

Besides the auxiliary channel C1 and the corrected auxiliary channel C1', the correction controller 60 is further capable of calculating other auxiliary channel(s), e.g., an auxiliary channel C2, according to color channels of the image Isc; accordingly, the corrector 20 is capable of providing the corrected image I' by: calculating multiple corrected auxiliary channels (e.g., C1' and C2') respectively according to the associated correction maps (e.g., m1 and m2) and the auxiliary channels (e.g., C1 and C2), and constructing multiple corrected color channels (e.g., c1' and c2') of the corrected image I' according to the corrected auxiliary channels.

As shown in FIG. 2 and FIG. 3, the correction controller 60 is capable of solving the coefficients a[1] to a[N1] by minimizing a target function U(A1,V1, I) which receives a set A1 of candidate coefficients, the intermediate image I and the bases (collectively as a set V1) as inputs.

In the database 92, one, some or all bases V[.] may be stored as two-dimensional matrices, while one, some or all bases V[.] may be compressed to be stored in the database 92. For the compressed basis (bases), the access circuit 90 or the correction controller 60 is capable of decompressing the compressed basis (bases).

In the embodiment of FIG. 5, the correction controller 60 is deposed behind AWB 30, because the correction controller 60 may leverage useful information (e.g., statistics) of the image I provided by AWB 30.

It is emphasized that, different units (image systems) of the same production batch or the same design, or even different image systems of different designs (e.g., of different combinations of optical module, sensor and associated circuitry), may exploit a same set of the bases V[.] to correct images captured under different illuminants. Though images captured by different image systems under different illuminants need different correction maps, different sets of the coefficients are applied with the same set of the bases V[.] to calculate different correction maps, so as to dynamically adapt variations due to design, assembling, manufacturing, and/or illuminant.

For example, if a same image system captures two images under two different illuminants, then two sets of coefficients a[1] to a[N1] can be obtained to respectively generates two correction maps m1 with the same set of bases V[1] to V[N1], so as to correct the two images respectively. Likewise, two image systems can apply their own sets of coefficients a[1] to a[N1] to respectively generates their own correction maps with the same set of the bases V[1] to V[N1], so as to correct images respectively captured by the two image systems. Furthermore, as shown in the example of FIG. 3, the same set of bases (or different subsets selected from the same set of bases) may also be exploited to generate multiple correction maps for correcting multiple color channels of a same image.

The bases V[.] may be obtained by first collecting a plurality of sample correction maps, and then applying dimension reduction on the sample correction maps. The sample correction maps may be experimentally calibrated correction maps obtained by measuring images captured by various units (image systems) under various illuminants. After applying the dimension reduction, a subspace spanned by a set of bases can be found, i.e., the bases can be linearly superposed to synthesize (or, within an acceptable error, approximating) any of the sample correction maps. The bases are therefore adopted to implement embodiments of FIG. 2 and FIG. 3. The dimension reduction technique may be: discrete cosine transform, wavelet transform, principal component analysis, generalized principal component analysis, independent component analysis, or sparse representation . . . etc.

Though the image system 200 shown in FIG. 5 includes image sensor 10 to provide the original image I, the invention can be generally applied to any image processing system where the image Isc to be corrected is received from storage medium and/or network . . . etc.

Though the embodiments shown in FIG. 2 to FIG. 5 aim to synthesize correction map by coefficient-weighted bases, what is synthesized may also be the non-uniformity (fall-off pattern) of the original image I, such as the green channel non-uniformity shown in FIG. 1. It is noted that, the fall-off pattern and correction map can be derived from one to the other; therefore, they should be treated equivalently and can be used interchangeably. That is, correcting color artifact of an image may include: finding a (or multiple) set of coefficients to synthesize a (or multiple) fall-off pattern of the image, accordingly calculating a (or multiple) correction map capable of compensating attenuation of the fall-off pattern, and then correct the original image.

To sum up, by sharing the same set of bases across different image systems, expensive, repetitive, time-consuming, resource-hungry and technically unsatisfactory individual calibration for each image system is no longer needed (or can be greatly simplified); variations due to assembling, manufacturing and illuminant can be adaptively and effectively overcome by dynamically solving associated coefficients. Therefore, the invention can both enhance image quality and reduce costs of image system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A method for correcting color artifact of an image provided by an image system, comprising:
   providing a plurality of bases, each of the bases providing a basic correction value for each pixel of an intermediate image associated with the image;

calculating a plurality of coefficients according to the intermediate image, each coefficient associated with one of the bases;
generating a correction map by respectively weighting the bases with the coefficients, and summing the weighted bases; and
providing a corrected image by correcting the image according to the correction map.

2. The method of claim 1 further comprising:
calculating an auxiliary channel according to color channels of the image;
wherein providing the corrected image comprises:
calculating a corrected auxiliary channel according to the correction map and the auxiliary channel; and
constructing a corrected color channel of the corrected image according to the corrected auxiliary channel.

3. The method of claim 2, wherein the auxiliary channel is calculated by:
dividing a predetermined color channel of the image by a reference color channel of the image.

4. The method of claim 3, wherein the reference color channel is a green color channel of the image, and the predetermined color channel is a red color channel or blue color channel of the image.

5. The method of claim 2 further comprising:
according to the correction map, providing an auxiliary correction map;
wherein the corrected auxiliary channel is calculated by multiplying the auxiliary channel with the auxiliary correction map.

6. The method of claim 5, wherein the correction map and the auxiliary correction map are of different dimensions.

7. The method of claim 2, wherein constructing the corrected color channel of the corrected image comprises:
multiplying a reference color channel of the image with the corrected auxiliary channel.

8. The method of claim 7, wherein the reference color channel is a green color channel of the image, and the corrected color channel is a red color channel or a blue color channel of the corrected image.

9. The method of claim 2, wherein the auxiliary channel is calculated by:
taking a logarithm of a ratio dividing a predetermined color channel of the image by a reference color channel of the image.

10. The method of claim 9, wherein the reference color channel is a green color channel of the image, and the predetermined color channel is a red color channel or a blue color channel of the image.

11. The method of claim 2 further comprising:
according to the correction map, providing an auxiliary correction map;
wherein the corrected auxiliary channel is calculated by:
summing the auxiliary channel and the auxiliary correction map.

12. The method of claim 11, wherein the correction map and the auxiliary correction map are of different dimensions.

13. The method of claim 2, wherein constructing the corrected color channel of the corrected image comprises:
multiplying a reference color channel of the image with an inverse logarithm of the corrected auxiliary channel.

14. The method of claim 13, wherein the reference color channel is a green color channel of the image, and the corrected color channel is a red color channel or a blue color channel of the corrected image.

15. The method of claim 1 further comprising:
calculating a plurality of second coefficients according to the image and the bases, each second coefficient associated with one of the bases;
generating a second correction map by summing the bases respectively weighted by the second coefficients; and
providing the corrected image further according to the second correction map.

16. The method of claim 15 further comprising:
calculating a second auxiliary channel according to color channels of the image;
wherein providing the corrected image further comprises:
calculating a second corrected auxiliary channel according to the second correction map and the second auxiliary channel; and
constructing a second corrected color channel of the corrected image according to the second corrected auxiliary channel.

17. The method of claim 1, wherein providing the corrected image comprises:
constructing a color channel of the corrected image by multiplying a color channel of the image of a same color with an auxiliary correction map provided according to the correction map.

18. The method of claim 1, wherein providing the corrected image comprises:
constructing a color channel of the corrected image by multiplying a color channel of the image of a same color with an inverse logarithm of an auxiliary correction map provided according to the correction map.

19. The method of claim 1, wherein the coefficients are so solved that the coefficients minimize a target function which receives a plurality of candidate coefficients, the intermediate image and the bases as inputs.

20. The method of claim 19, wherein the target function comprises a first cost function, the first cost function is formulated by a sum of weighted local terms, and
each local term is associated with a pixel of the intermediate image, and is formulated by a powered norm of a spatial gradient of a pseudo corrected auxiliary channel at the associated pixel; and
the pseudo corrected auxiliary channel is formulated according to the intermediate image and a pseudo correction map which is formulated by a sum of the bases respectively weighted by the candidate coefficients.

21. The method of claim 19, wherein the target function comprises a second cost function, which is indicative of a difference between the plurality of candidate coefficients and a plurality of reference coefficients.

22. An apparatus for correcting color artifact of an image provided by an image system, comprising:
an access circuit for obtaining a plurality of bases, each of the bases providing a basic correction value for each pixel of the image;
a correction controller, coupled to the access circuit, for:
calculating a plurality of coefficients according to the image, each coefficient associated with one of the bases; and
generating a correction map by respectively weighting the bases with the associated coefficients, and summing the weighted bases; and
a corrector, coupled to the correction controller, for providing a corrected image by correcting the image according to the correction map.

23. The apparatus of claim 22, wherein the correction controller is further arranged to calculate an auxiliary channel according to color channels of the image, and the corrector is arranged to provide the corrected image by:
calculating a corrected auxiliary channel according to the correction map and the auxiliary channel; and
constructing a corrected color channel of the corrected image according to the corrected auxiliary channel.

24. The apparatus of claim 23, wherein the correction controller is arranged to calculate the auxiliary channel by: dividing a predetermined color channel of the image by a reference color channel of the image.

25. The apparatus of claim 23, wherein the corrector is arranged to calculate the corrected auxiliary channel by multiplying the auxiliary channel with an auxiliary correction map provided according to the correction map.

26. The apparatus of claim 23, wherein the corrector is arranged to construct the corrected color channel by multiplying a reference color channel of the image with the corrected auxiliary channel.

27. The apparatus of claim 23, wherein the correction controller is arranged to calculate the auxiliary channel by: taking a logarithm of a ratio dividing a predetermined color channel of the image by a reference color channel of the image.

28. The apparatus of claim 23, wherein the corrector is arranged to calculate the corrected auxiliary channel by: summing the auxiliary channel and an auxiliary correction map provided according to the correction map.

29. The apparatus of claim 23, wherein the corrector is arranged to construct the corrected color channel by multiplying a reference color channel of the image with an inverse logarithm of the corrected auxiliary channel.

30. The apparatus of claim 22, wherein the correction controller is further arranged to:
calculate a plurality of second coefficients according to the image and the bases, each second coefficient associated with one of the bases; and
generate a second correction map by summing the bases respectively weighted by the associated second coefficients; and
the corrector is arranged to provide the corrected image further according to the second correction map.

31. The apparatus of claim 30, wherein the correction controller is further arranged to calculate a second auxiliary channel according to color channels of the image; and the corrector is arranged to provide the corrected image further by
calculating a second corrected auxiliary channel according to the second correction map and the second auxiliary channel; and
constructing a second corrected color channel of the corrected image according to the second corrected auxiliary channel.

32. The apparatus of claim 22, wherein the correction controller is arranged to solve the coefficients by minimizing a target function which receives a plurality of candidate coefficients, an intermediate image and the bases as inputs, with the intermediate image being associated with the image.

33. The apparatus of claim 32, wherein the target function comprises a first cost function, which is formulated by a sum of weighted local terms, and
each local term is associated with a pixel of the intermediate image, and is formulated by a powered norm of a spatial gradient of a pseudo corrected auxiliary channel at the associated pixel; and
the pseudo corrected auxiliary channel is formulated according to the intermediate image and a pseudo correction map which is formulated by a sum of the bases respectively weighted by the candidate coefficients.

34. The apparatus of claim 33, wherein the pseudo corrected auxiliary channel is formulated by a product of an auxiliary channel and the pseudo correction map; the auxiliary channel is calculated according to color channels of the intermediate image.

35. The apparatus of claim 33, wherein the pseudo corrected auxiliary channel is formulated by a sum of an auxiliary channel and the pseudo correction map;
the auxiliary channel is calculated according to color channels of the intermediate image.

36. The apparatus of claim 33, wherein each of the weighted local terms is weighted by a weighting term determined according to a gradient term, and the gradient term is calculated based on a spatial gradient of the auxiliary channel at the associated pixel of each local term.

37. The apparatus of claim 36, wherein the weighting term is selectively set to two different constants according to whether the gradient term is less than a threshold.

38. The apparatus of claim 32, wherein the target function comprises a second cost function, which is indicative of a difference between the plurality of candidate coefficients and a plurality of reference coefficients.

* * * * *